(12) United States Patent
Kraihanzel

(10) Patent No.: US 6,367,596 B1
(45) Date of Patent: *Apr. 9, 2002

(54) BRAKING APPARATUS

(75) Inventor: C. Stephen Kraihanzel, Indianapolis, IN (US)

(73) Assignee: Perry Reeve Limited, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/694,654

(22) Filed: Oct. 23, 2000

Related U.S. Application Data

(63) Continuation of application No. 09/145,685, filed on Sep. 2, 1998, now Pat. No. 6,135,243.

(51) Int. Cl.$^7$ ............................................. B60T 13/04
(52) U.S. Cl. ....................... 188/171; 188/72.9; 188/72.7
(58) Field of Search ................... 188/72.9, 72.7, 188/171, 72.1, 72.3; 74/99 R

(56) References Cited

U.S. PATENT DOCUMENTS

| | | | | |
|---|---|---|---|---|
| 3,665,232 A | * | 5/1972 | Speransky et al. | 188/171 |
| 3,682,279 A | * | 8/1972 | Palme et al. | 188/171 |
| 4,130,188 A | * | 12/1978 | Askew | 188/170 |
| 4,181,201 A | * | 1/1980 | McCarthy | 188/171 |
| 4,570,758 A | * | 2/1986 | Hendricks | 188/72.3 |
| 4,823,916 A | * | 4/1989 | Shyu | 188/24.12 |
| 4,828,077 A | * | 5/1989 | Stevens | 188/171 |
| 5,101,939 A | * | 4/1992 | Sheridan | 188/171 |
| 5,186,287 A | * | 2/1993 | Lindner et al. | 188/171 |
| 5,337,878 A | * | 8/1994 | Mehlert et al. | 188/171 |
| 5,421,436 A | * | 6/1995 | Lindner et al. | 188/171 |
| 5,603,395 A | * | 2/1997 | Mabee | 188/71.5 |
| 5,899,304 A | * | 5/1999 | Daugherty | 188/171 |
| 6,135,243 A | * | 10/2000 | Kraihanzel | 188/72.9 |

* cited by examiner

*Primary Examiner*—Christopher P. Schwartz
*Assistant Examiner*—Devon Kramer
(74) *Attorney, Agent, or Firm*—Maginot, Moore & Bowman

(57) ABSTRACT

An apparatus for braking a rotating member having an engaged state and a disengaged state is disclosed. Rotation of the rotating member is inhibited by the apparatus when the apparatus is in the engaged state. The braking apparatus includes a housing, an actuator, and a first brake structure. The first brake structure includes a brake pad having a contact surface. The brake structure is pivotally connected to the housing and further connected to the actuator. The actuator is operable to cause pivotal motion of the brake structure, thereby causing arcuate motion of the contact surface toward the rotating member. The frictional force between the rotating member and the contact surface causes further arcuate motion of the contact surface toward the rotating member and places the apparatus in the engaged state.

21 Claims, 5 Drawing Sheets

BRAKING APPARATUS

CROSS REFERENCE TO RELATED APPLICATIONS

This is a continuation application of U.S. patent application Ser. No. 09/145,685, filed Sep. 2, 1998 is now U.S. Pat. No. 6,135,243.

Government License

The U.S. Government has a paid-up license in this invention and the right in limited circumstances to require the patent owner to license others on reasonable terms, as provided by the terms of Government Contract DTMA 91-95-H-00075, awarded by the U.S. Department of Transportation, Maritime Administration.

FIELD OF THE INVENTION

The present invention relates generally to a braking apparatus, and more specifically to a braking apparatus for braking a rotating member.

BACKGROUND OF THE INVENTION

Braking apparatus are employed to inhibit motion in various devices that have rotating members. One such device is a robot, which may employ a braking apparatus to inhibit motion of the robot arm.

In particular, robots typically include a robot arm to move a work tool between various locations where work operations are performed on a work piece. To move the robot arm, the robot includes a motor that provides rotational motion through a shaft. Linkages or other structures within the robot convert such rotational motion into desired movement of the robot arm. To stop the robot arm in a particular position, precise motor control is used. While precise motor control is typically sufficient to stop and hold the robot arm in position, a brake is also required by the robot to hold a robot arm in position either in an emergency stop or during a power interruption.

More specifically, upon the loss of electrical power due to the initiation of an emergency stop or an accidental power loss the robot arm must be stopped and held in position by means other than motor control. Stopping and holding the robot arm in position during the accidental loss of electrical power prevents the robot from damaging the work piece or injuring a technician working in close proximity to the robot arm. Because the control signals which cause the motor to hold the robot arm in position are absent without electrical power, it is necessary that a braking mechanism be employed to stop and hold the robot arm in the event of a power loss. The braking mechanism can also be used to stop and hold the robot arm in position when the electrical power is purposefully removed from the motor, such as during routine maintenance of the robot.

In a conventional braking apparatus, such as the disk brakes used in automobiles, a rigid brake pad is urged into contact with a rotating member attached to the shaft. Contact between the rigid brake pad and the rotating member creates a frictional force which slows the rotation of the rotating member and, thus, the shaft. In order to rapidly stop the shaft, a relatively large force must be applied to the brake pad. Additionally, to enable fail safe operation, this large force must be provided by a biasing member, such as a spring, which does not require electrical power. This biasing member is operable to urge the brake pad into contact with the rotating member in the event of a power loss.

The robot arm also includes a brake actuator which is operable to overcome the relatively large force of the biasing member when it is desired to allow movement of the robot arm. Because the brake actuator must overcome the large bias force, a relatively large and powerful brake actuator must be provided. Accordingly, one drawback to using a conventional braking apparatus is that a relatively large and bulky actuator must be carried in the robot arm, which undesirably increases the size and weight of the robot arm. Increasing the size of the robot arm inhibits the maneuverability of the robot arm in confined spaces, and may limit the type of work operations performed by the robot. Moreover, the increased weight of the robot arm may require a more powerful motor, thereby raising the cost of the robot.

What is needed therefore is an apparatus and method for braking a robot arm which rapidly stops and holds the robot arm in position during the loss of electrical power without significantly increasing the size or weight of the robot arm.

SUMMARY OF THE INVENTION

The present invention addresses the above needs, as well as others, by providing a method and apparatus for braking a robot arm that employs elastically deformable brake pads that are engaged using a pivotal motion. The elastically deformable brake pads pivot toward a rotating member in the direction of the rotation such that frictional forces between the rotating member causes the brake pad to bind the rotating member. As a result, a large stopping or braking force may be provided with less biasing force, thereby facilitating the use of a relatively small and light weight brake actuator.

In accordance with a first embodiment of the present invention, there is provided an apparatus for braking a rotating member. The apparatus has an engaged state and a disengaged state, wherein rotation of the rotating member is inhibited by the apparatus when the apparatus is in the engaged state. The braking apparatus includes a housing, an actuator, and a first brake structure. The first brake structure includes a brake pad having a contact surface. The brake structure is pivotally connected to the housing and further connected to the actuator. The actuator is operable to cause pivotal motion of the brake structure, thereby causing arcuate motion of the contact surface toward the rotating member. The frictional force between the rotating member and the contact surface and elastic deformation of one of the rotating member and the contact surface causes further arcuate motion of the contact surface toward the rotating member and places the apparatus in the engaged state.

In accordance with a second embodiment of the present invention, there is provided an apparatus for braking a rotating member. The apparatus has an engaged state and a disengaged state wherein rotation of the rotating member is inhibited by the apparatus when the apparatus is in the engaged state. The apparatus includes a housing, an actuator, and a first brake structure. The first brake structure includes a brake pad which is elastically deformable and having a substantially convex contact surface. The brake structure is pivotally connected to the housing and further connected to the actuator. The actuator is operable to cause pivotal motion of the brake structure, thereby causing arcuate motion of the contact surface toward the rotating member so as to place the apparatus in the engaged state.

This invention has the advantage of using pivotal motion to move an elastically deformable brake pad into contact with a rotating member. The resultant self-binding action of the brake pad allows the frictional forces to increase the rate at which the rotating member is braked. Optionally, the present invention may further employ two opposing pairs of such brake pads. One pair of brake pads are oriented to stop and retain the rotating member when the rotating member is rotating in a first direction and the opposing pair of brake pads are oriented to stop and retain the rotating member when the rotating member is rotating in a second direction.

The above features and advantages, as well as others, will become readily apparent to those of ordinary skill in the art by reference to the following detailed description and accompanying drawings.

DETAILED DESCRIPTION

Figure 1:
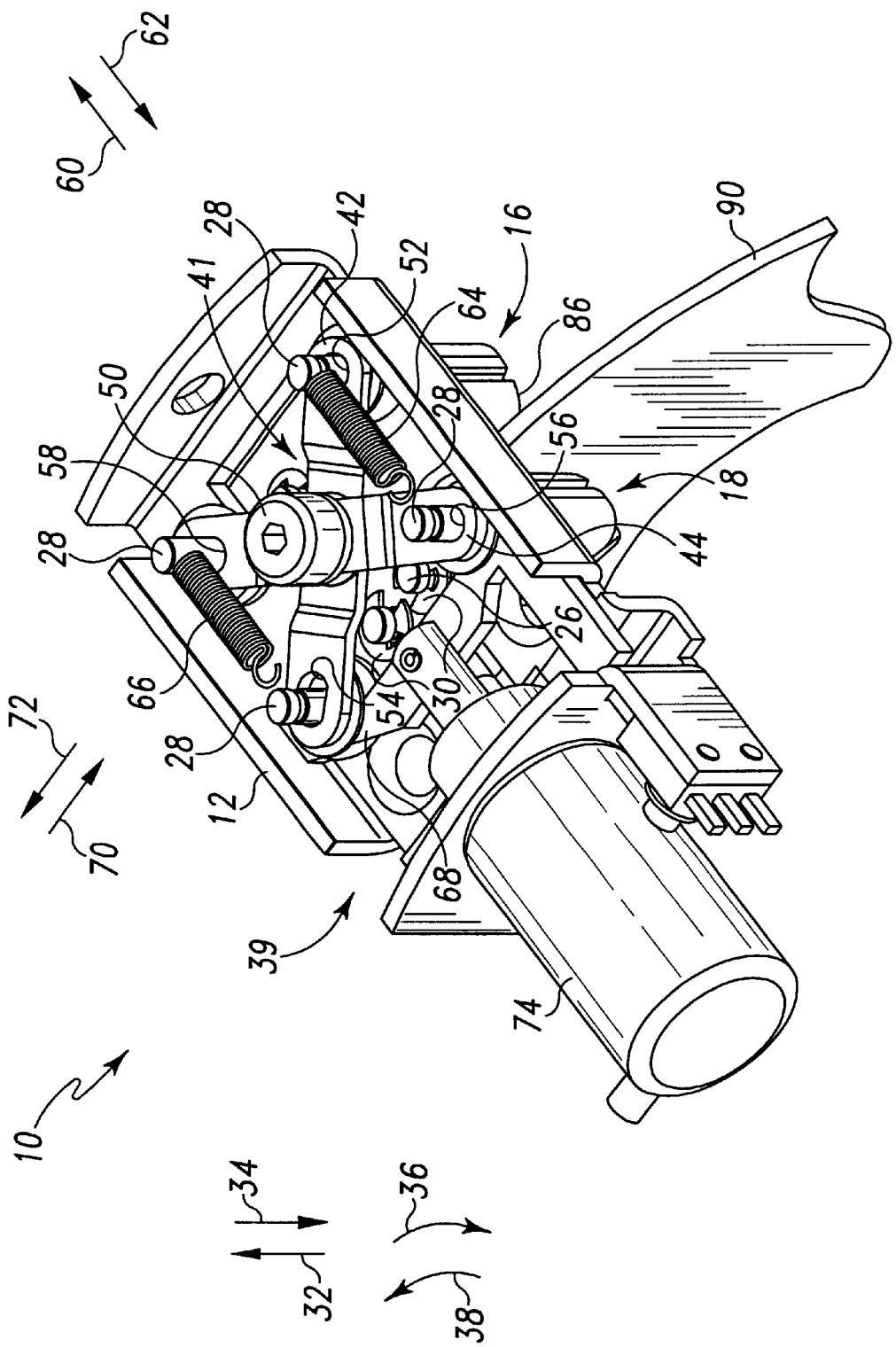
FIG. 1 is a perspective view of an exemplary embodiment of a braking apparatus according to the present invention.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
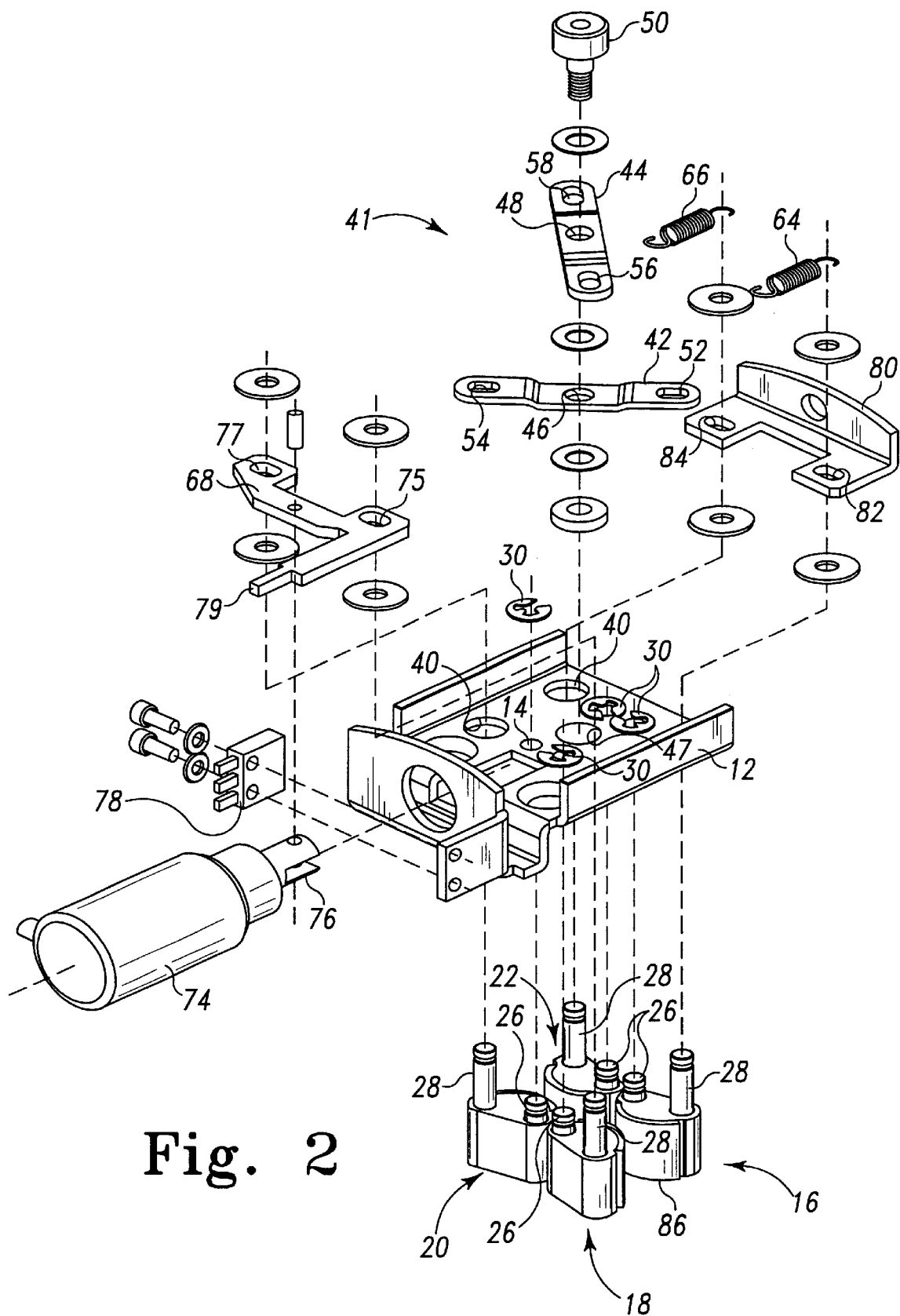
FIG. 2 is a exploded view of the braking apparatus of FIG. 1.

FIGS. 1 and 2 illustrate an exemplary embodiment of a brake assembly 10 according to the present invention. The brake assembly 10 includes a housing 12 an actuator assembly 39, and first, second, third and fourth brake structures 16, 18 ,20, and 22, respectively. As discussed further below, each of the brake structures includes a brake pad such as the brake pad 86, and each brake pad in turn has a contact surface, such as the contact surface 94 of the brake pad 86. It should be noted that the terms "actuator" and "actuator assembly" as used herein refer to actuator components of the brake assembly, as opposed to referring to the robot actuator itself.

In accordance with the present invention, the brake assembly 10 alternatively engages a rotating member 90 of a robotic device to stop rotation of the member 90 and disengages the rotating member 90 to allow rotation of the member 90. In particular, to engage the brake assembly 10, the actuator assembly 39 causes pivotal motion of each brake structure, thereby causing arcuate motion of each corresponding contact surface toward the rotating member 90. Contact between the contact surface and the rotating member 90 causes elastic deformation of the corresponding brake pad, or alternatively, the rotating member 90 itself. The elastic deformation and the frictional force causes further arcuate motion of the contact surface toward the rotating member 90. The further arcuate motion of the contact surface toward the rotating member results in a binding force that absorbs rotational energy, thereby causing the rotating member 90 to ultimately stop.

In further detail, each of the brake structures 16, 18, 20, 22 in the exemplary embodiment described herein further includes a pivot pin 26 and an actuation pin 28. The pivot pin 26 of each of the respective brake structures 16, 18, 20, 22 is received through one of a plurality of pin apertures 14 defined in the housing 12 (see FIG. 2). Each pivot pin 26 is secured to the housing 12 by a fastener, such as the clip 30. The clip 30 prevents the brake structures 16, 18, 20, 22 from moving in the general directions of arrows 32 and 34 while allowing pivotal motion of each of the brake structures 16, 18, 20, 22 relative to the housing 12 about their respective pivot pin 26.

The housing 12 in the exemplary embodiment described herein further includes four guide slots 40 (shown in FIG. 2) defined therein. The actuation pin 28 of each of the brake structures 16, 18, 20, and 22 is received through a corresponding guide slot 40. In particular, as the pivot pin 26 of a respective brake structure 16, 18, 20, 22 is received through the pin aperture 14, the actuation pin 28 of the same brake structure 16, 18, 20, 22 is received through the respective guide slot 40. It should be appreciated that the guide slot 40 of each braking member 16, 18, 20, 22 restricts the range of pivotal motion of the respective brake structure 16, 18, 20, 22 about the corresponding pivot pin 26 in the general direction of arrows 36 and 38.

Figure 3:
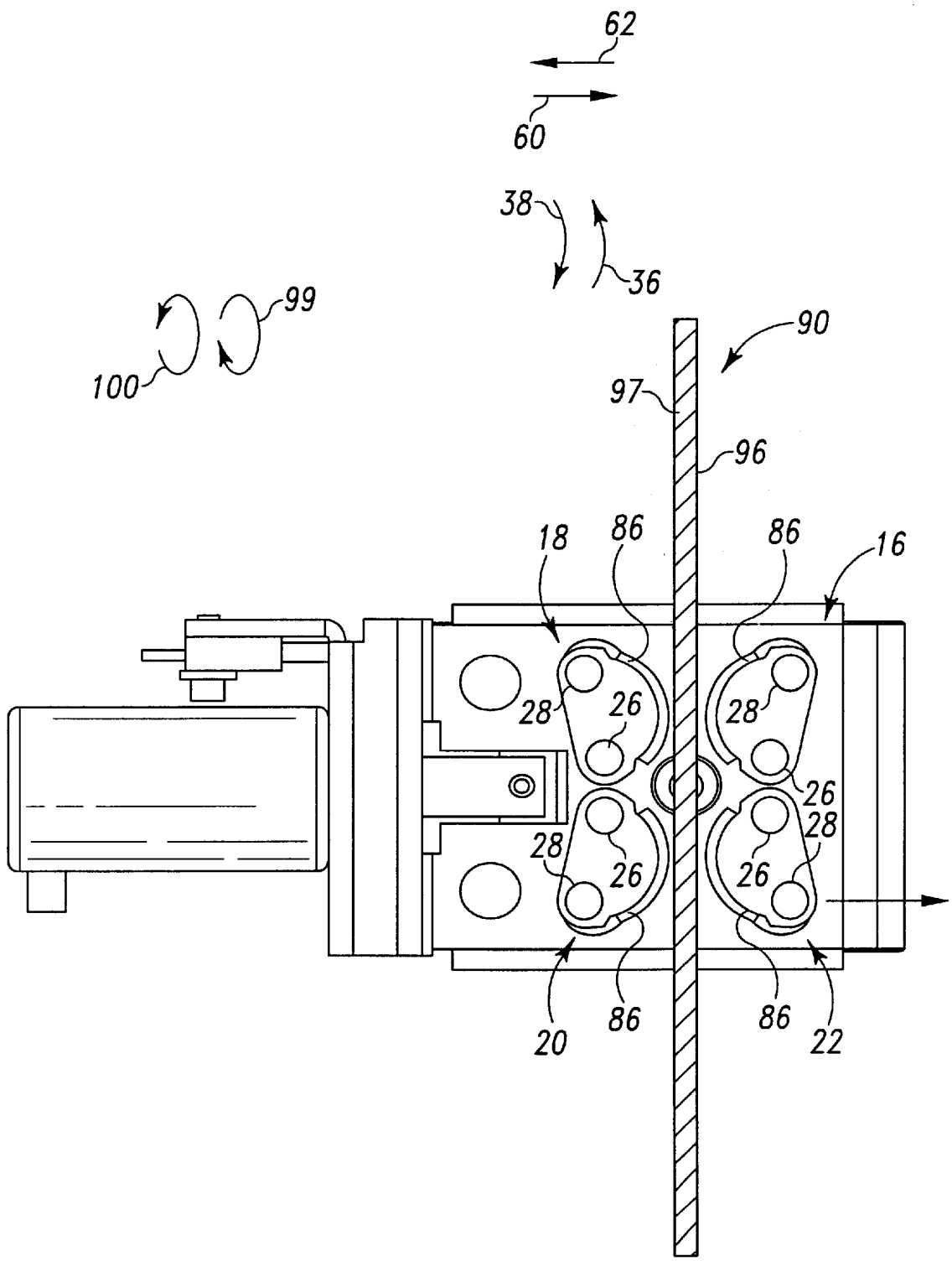
FIG. 3 is a bottom elevational view of the braking apparatus of FIG. 1, note that the braking apparatus is positioned in the disengaged state.
Figure 4:
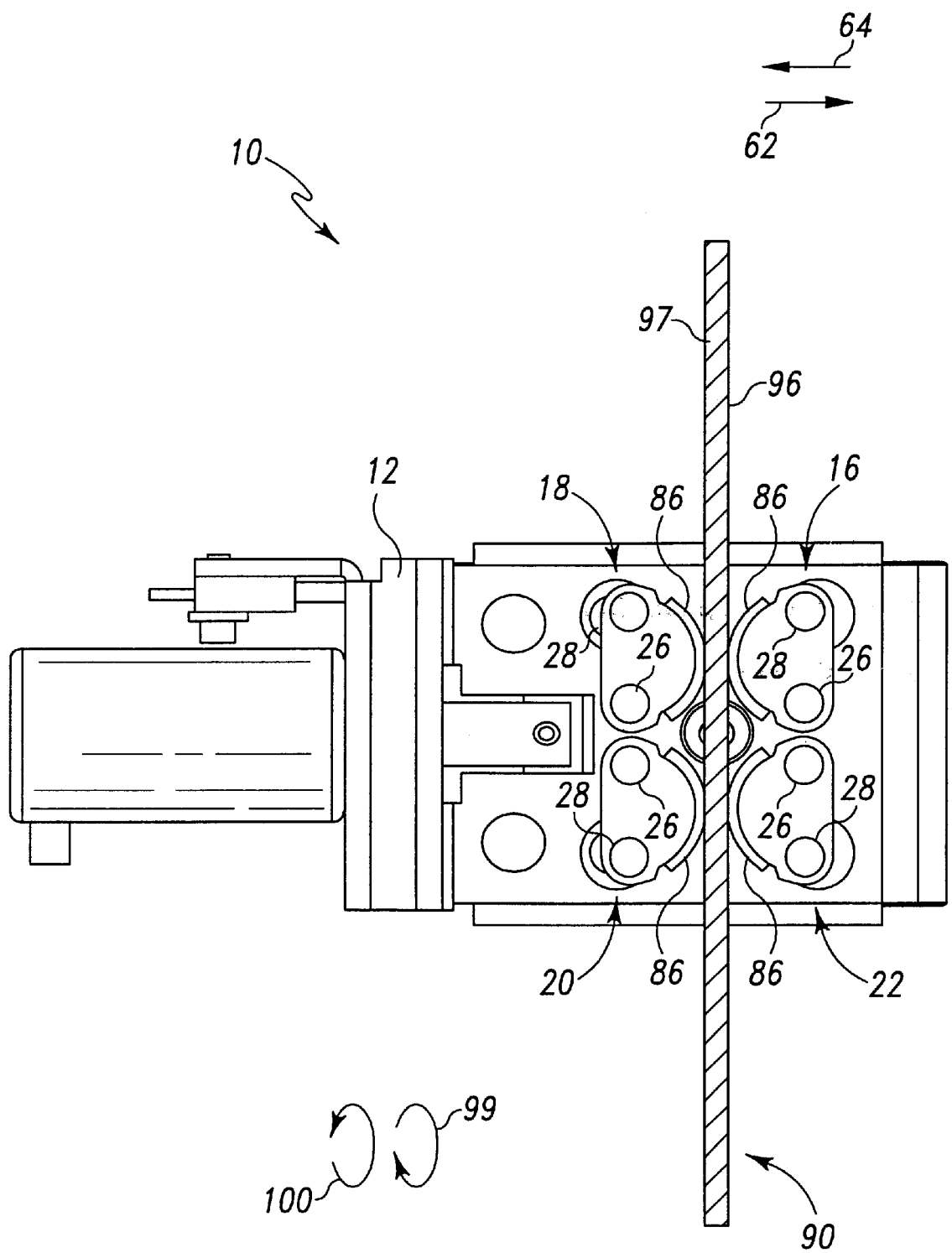
FIG. 4 is a view similar to FIG. 3, but showing the braking apparatus positioned in the engaged state.

FIGS. 3 and 4 show bottom elevational views of the braking assembly 10 of FIG. 1. As will be discussed further below, FIG. 3 shows the braking assembly 10 in the disengaged state, and FIG. 4 shows the braking assembly 10 in the engaged state.

Referring again to FIGS. 1 and 2, the actuator assembly 39 in the embodiment described herein includes a cross linkage 41, a first spring 64, a second spring 66, a drive plate 62, a solenoid 74 and a manual override plate 80. In general, the cross linkage 41 and the first and second springs 64 and 66 form a spring biased linkage. As discussed below, the spring biased linkage formed by the cross linkage 41 and the springs 64 and 66 biases the contact surfaces 94 of the brake structures 16, 18, 20 and 22 toward the rotating member 90.

In further detail, the cross linkage 41 of the exemplary actuator assembly 39 described herein interconnects the actuator pins 28 of each of the brake structures 16, 18, 20, and 22. To this end, the cross linkage 41 includes a first lever 42 and a second lever 44. Both the first lever 42 and the second lever 44 are pivotally secured to an aperture 47 (shown in FIG. 2) of the housing 12.

In particular, a pivot aperture 46 (shown in FIG. 2) is defined near the center point of the first lever 42, and a pivot aperture 48 (shown in FIG. 2) is defined near the center point of the of the second lever 44. A fastener, such as a bolt 50 is inserted through both the pivot aperture 48 of the second lever 44 and the pivot aperture 46 of the first lever 42, and is then secured to the housing 12. It should be appreciated that securing the first lever 42 to the housing 12 with the bolt 50 allows the first lever 42 and the second lever 44 to pivot about the bolt 50 in the general direction of arrows 36 and 38.

In addition, the first lever 42 includes a first pin slot 52 defined through one end and a second pin slot 54 defined through the opposing end. The actuation pin 28 of the first brake structure 16 is received through the first pin slot 52 whereas the actuation pin 28 of the third brake structure 20 is received through the second pin slot 54.

In a similar fashion, the second lever 44 includes a first pin slot 56 defined through one end and a second pin slot 58 defined through the opposing end. The actuation pin 28 of the second brake structure 18 is received through the first pin slot 56 whereas the actuation pin 28 of the fourth brake structure 22 is received through the second pin slot 58.

The first spring 64 and the second spring 66 of the exemplary embodiment of the actuator assembly 39 described herein provide spring biasing to the cross linkage 41 to allow the brake assembly 10 to be normally engaged. To this end, one end of the first spring 64 is attached to the actuator pin 28 of the first brake structure 16 whereas the other end of the first spring 64 is attached to the actuator pin 28 of the second brake structure 18.

In a similar manner, one end of the second spring 66 is attached to the actuator pin 28 of the fourth brake structure 22 while the other end of the second spring 66 is attached to the actuator pin 28 of the third brake structure 20.

The drive plate 68 of the exemplary embodiment of the actuator assembly 39 described herein provides a drive mechanism through which movement of the springloaded cross linkage 41 may be controlled. The drive plate 68 is operatively housed in the housing 12 such that the drive plate 68 is free to translate in the general direction of arrows 60 and 62. The housing 12 inhibits movement of the drive plate 68 in the general directions of arrows 70 and 72. The drive plate 68 has a first drive aperture 75 (shown in FIG. 2) and a second drive aperture 77 (shown in FIG. 2) defined therein. The drive plate 68 is interposed between the housing 12 and each of the first lever 42 and the second lever 44, prior to the assembly of the linkage 41. In particular, the actuation pin 28 of the second brake structure 18 is received through the first drive aperture 75 of the drive plate 68 before being received through the first pin slot 56 of the second lever 44 whereas the actuation pin 28 of the third brake structure 20 is received through the second drive aperture 77 of the drive plate 68 before being received through the second pin slot 54 of the first lever 42.

The first drive aperture 75 and the second drive aperture 77 are equally distant from the bolt 50. Accordingly, movement of the drive plate 68 in the general direction of arrow 62 causes the first lever 42 to rotate in the general direction of arrow 38 an amount substantially identical to the amount the second lever 44 rotates in the general direction of arrow 36. The bias force of the first spring 64 acting on the actuation pin 28 of the second brake structure 18 and the bias force of the second spring 66 acting on the actuation pin 28 of the third brake structure 20 both act to urge the drive plate 68 in the general direction of arrow 60.

The solenoid 74 of the exemplary embodiment of the actuator assembly 39 described herein is secured to the housing 12. The solenoid 74 includes a plunger 76. The end of the plunger 76 is secured to the drive plate 68. The plunger 76 is operable to move in the general direction of arrows 60 and 62 in response to a signal from a control unit, not shown.

The manual override plate 80 of the exemplary actuator assembly 39 described herein is operatively housed in the housing 12 such that the manual override plate 80 is free to translate in the general direction of arrows 60 and 62. The housing 12 inhibits movement of the manual override plate 80 in the general directions of arrows 70 and 72. The manual override plate 80 has a first plate aperture 82 (shown in FIG. 2) and a second plate aperture 84 (shown in FIG. 2) defined therein. The manual override plate 80 is interposed between the housing 12 and each of the first lever 42 and the second lever 44 prior to the assembly of the linkage 41. In particular, the actuation pin 28 of the first brake structure 16 is received through the first plate aperture 82 of the manual override plate 80 before being received through the first pin slot 52 of the first lever 42 whereas the actuation pin 28 of the fourth brake structure 22 is received through the second plate aperture 84 of the drive plate 68 before being received through the second pin slot 58 of the second lever 44.

It should be appreciated that first plate aperture 82 and the second plate aperture 84 are equally distant from the bolt 50 such that translation of the manual override plate 80 in the general direction of arrow 60 causes the first lever 42 to rotate in the general direction of arrow 36 an amount substantially identical to the amount the second lever 42 rotates in the general direction of arrow 38. It should further be appreciated that the bias force of the first spring 64 acting on the actuation pin 28 of the first brake structure 16 and the bias force of the second spring 66 acting on the actuation pin 28 of the fourth brake structure 20 both act to urge the manual override plate 80 in the general direction of arrow 62.

It will be noted that the configuration of the actuator assembly 39 shown in FIGS. 1–4 and discussed above is given by way of example only. Those of ordinary skill in the art may readily devise alternative actuators operable to cause the pivotal motion of the brake structures discussed herein. Such alternative embodiments, though different, would nevertheless provide many of the advantages of the present invention.

The break assembly 10 preferably further includes means for generating an electrical signal indicative of whether the brake assembly 10 is in the engaged or disengaged state. For example, the brake assembly 10 of FIGS. 1 and 2 further include a contact switch 78 and a corresponding drive plate extension 79. The contact switch 78 is mounted on the housing 12. The drive plate extension 79 is advantageously positioned to actuate the contact switch 78 when the brake assembly 10 is in the disengaged state and to release the contact switch 78 when the brake assembly 10 is in the engaged state. Other arrangements for generating a signal indicative of the state of the brake assembly 10 may readily be used.

In operation, the brake assembly 10 is spring biased in the engaged state. FIG. 3 shows the brake assembly 10 in the engaged state. In the engaged state, the frictional force between the brake pads 86 of one or more the brake structures 16, 18, 20 and 22 and the rotating member 90 substantially inhibits rotational motion of the rotating member 90. As such, the robot arm in which the brake assembly 10 is incorporated is secured in position.

To allow operation of the robot arm, the brake assembly 10 disengages. To this end, the actuator assembly 39 operates to overcome the spring bias on the cross linkage 41. In order to re-engage the brake assembly 10, the power to the solenoid 74 is interrupted. Specifically, power to the solenoid 74 may be interrupted by a power failure or by actuation of a stop button. Upon occurrence of such a power interruption, the brake assembly 10 engages by removing the force that overcomes the spring bias.

While the brake assembly 10 is engaged, it may be necessary to manually rotate or adjust the robot arm. To this end, an operator manipulates the manual override 80 which overcomes the spring bias to disengage the brake assembly 10.

The operation of the braking assembly is now discussed in further detail in reference to FIGS. 1, 2, 3, 4 and 5A–5C.

When no power is provided to the actuator assembly 39, and in particular, the solenoid 74, the first spring 64 and the second spring 66 provide the spring biasing force to the cross linkage 41 to cause the brake assembly 10 to be normally engaged. (See FIG. 4). To allow rotation of the rotating disk 90, the control unit provides a signal or voltage to the solenoid 74 that causes the brake assembly 10 to disengage. In particular, referring specifically to FIGS. 1 and 2, when the control unit (not shown) provides a voltage to the solenoid 74, windings (not shown) in the solenoid 74 create a magnetic field which urges the plunger 76 in the general direction of arrow 62. As the force of the plunger 76 acting upon the drive plate 68 in the general direction of arrow 62 overcomes the spring bias forces of the first spring 64 and the second spring 66, the drive plate 68 moves in the general direction of arrow 62.

Movement of the drive plate 68 in the general direction of arrow 62 causes the pivotal motion of the brake structures 16, 18, 20 and 22 away from the rotating member 90.

In particular, movement of the drive plate 68 in the direction of the arrow 62 causes the first lever 42 to pivot about the bolt 50 in the general direction of arrow 38, thereby urging the actuation pin 28 of the first brake structure 16 in the general direction of arrow 60. As a result, the first brake structure 16 in the general direction of the arrow 38, or in other words, pivots away from the rotating member 90.

Moreover, as the first lever 42 also pivots about the bolt 50 in the general direction of arrow 38, the first lever 42 urges the actuation pin 28 of the third brake structure 20 in the general direction of arrow 62. As a result, the third brake structure 20 pivots in the direction of arrow 38, or in other words, away from the rotating member 90.

In addition, movement of the drive plate 68 in the direction of arrow 62 causes the second lever 44 to pivot about the bolt 50 in the general direction of arrow 36. The second lever 44 thereby urges the actuation pin 28 of the second brake structure 18 in the general direction of arrow 62, causing the first brake structure 16 to pivot about the pivot pin 26 in the general direction of arrow 36. As a result the second brake structure 18 also pivots away from the rotating member 90.

Furthermore, as the second lever 44 pivots about the bolt 50 in the general direction of arrow 36, the second lever 44 urges the actuation pin 28 of the fourth brake structure 22 in the general direction of arrow 60. As a result, the fourth brake structure 22 pivots in the general direction of arrow 36, or in other words, away from the rotating member 90.

Thus, movement of the drive plate 68 causes each of the brake structures 16, 18, 20 and 22 to pivot away from the rotating member 90. After the brake structures 16, 18, 20 and 22 pivot away from the rotating member 90, the brake assembly 10 is disengaged and the rotating member 90 is free to rotate.

At any time during operation of the robot, power may be removed from the solenoid 74, which causes the brake assembly 10 to engage as described below. Power may be removed from the solenoid 74 as a result of a power failure, or through intentional actuation of a stop button, not shown, in the robot work cell. In response to the actuation of the stop button, the control unit stops providing a voltage to the solenoid 74, thereby causing power to be removed from the solenoid 74.

When power to the solenoid 74 is interrupted, the bias force of the first spring 64 and the second spring 66 urge the drive plate 68 in the general direction of arrow 60 to return the drive plate 68 to the position shown in FIGS. 1, 2 and 4. As discussed below, movement of the drive plate 68 in the direction of the arrow 60 causes engagement of the brake assembly 10.

In particular, movement of the drive plate 68 in the direction of arrow 60 causes the first lever 42 to pivot about the bolt 50 in the general direction of arrow 36. The first lever 42 thus urges the actuation pin 28 of the first brake structure 16 in the general direction of arrow 62, causing the first brake structure 16 to pivot about the pivot pin 26 in the general direction of arrow 36. As a result, the first brake structure 16 pivots toward the rotating member 90.

Contemporaneously, as the first lever 42 pivots about the bolt 50 in the general direction of arrow 36, the first lever 42 urges the actuation pin 28 of the third brake structure 20 in the general direction of arrow 60, thereby causing the third brake structure 20 to pivot about the pivot pin 26 in the general direction of arrow 36. As a result, the third brake structure 20 also pivots towards the rotating member 90.

The movement of the drive plate 68 in the direction of arrow 60 further causes the second lever 44 to pivot about the bolt 50 in the general direction of arrow 38. The second lever 44 thereby urges the actuation pin 28 of the second brake structure 18 in the general direction of arrow 60, causing the second brake structure 18 to pivot about the pivot pin 26 in the general direction of arrow 38. As a result, the second brake structure 18 pivots toward the rotating member 90.

Contemporaneously, as the second lever 44 pivots about the bolt 50 in the general direction of arrow 38, the second lever 44 urges the actuation pin 28 of the fourth brake structure 22 in the general direction of arrow 62, causing the fourth brake structure 22 to pivot about the pivot pin 26 in the general direction of arrow 38. As a result, the fourth brake structure 22 also pivots towards the rotating member 90.

The pivotal motion of the brake structures 16, 18, 20 and 22 toward the rotating member 90 causes engagement of the brake assembly 90. To this end, if the rotating member 90 is rotating in a first direction, then the pivotal movement of the first brake structure 16 and the second brake structure 18 provides a binding braking action to the rotating member 90. Contrariwise, if the rotating member 90 is rotating in a second direction, then the pivotal movement of the third brake structure 20 and the fourth brake structure 22 and provide a binding braking action to the rotating member 90. Further detail regarding the interaction of the brake structures 16, 18, 20 and 22 and the rotating member 90 during engagement of the brake assembly 10 is provided below in connection with FIGS. 5A–5C.

When the brake assembly 10 is in the engaged state, it may occasionally be necessary for an operator to manually manipulate the robot arm. To this end, the operator employs the manual override plate 80 to temporarily disengaged the brake while power is still removed from the solenoid 74.

In particular, to operate the manual override, an operator grasps and pulls on the manual override plate 80, thereby causing the manual override plate 80 to move in the general direction of arrow 60. As the force applied to the manual override plate 80 overcomes the spring bias forces of the first spring 64 and the second spring 66 in the general direction of arrow 60, the cross linkage 41 translates such motion to the drive plate such that the drive plate 68 moves in the general direction of arrow 62. As discussed above, movement of the drive plate in the direction of the arrow 62 causes disengagement of the brake assembly 10.

When the force is removed from the manual override plate 80, the bias force of the first spring 64 and the second spring 66 urge the manual override plate 80 in the general direction of arrow 62 to return the drive plate 68 to the position shown in FIGS. 1 and 2.

An important feature of the embodiment of the present invention described herein is the employment of pivotal motion of the brake pads 86 combined with plastic deformation of the brake pads 86 to create a binding braking action. Such a binding braking action allows for smaller brake structures to achieve the same braking ability as much larger, conventional disk-type brake structures.

Figure 5A:
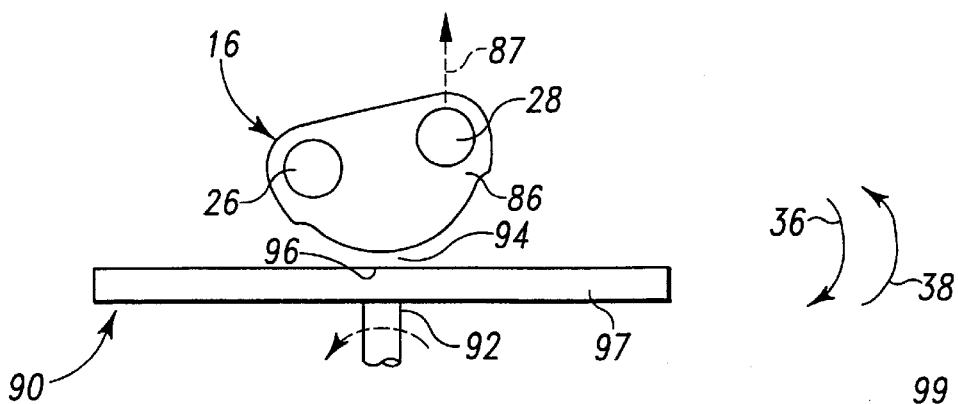
FIG. 5A is a enlarged side elevation view of a brake pad prior to engaging the rotating member.
Figure 5B:
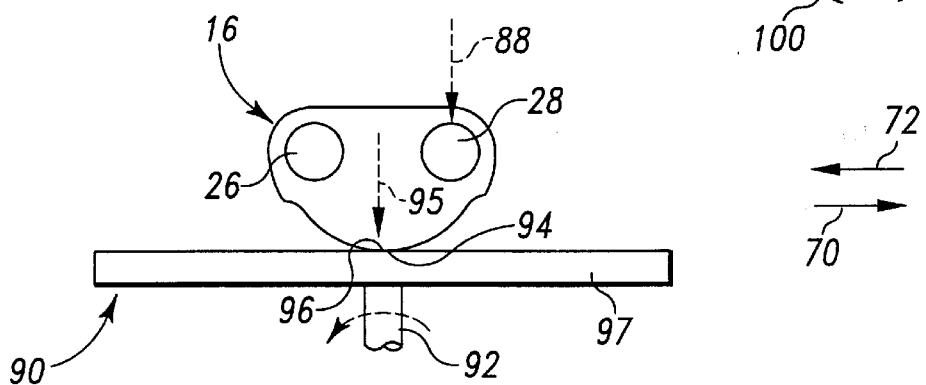
FIG. 5B is a view similar to that shown in FIG. 5A but showing the brake pad engaging the rotating member.
Figure 5C:
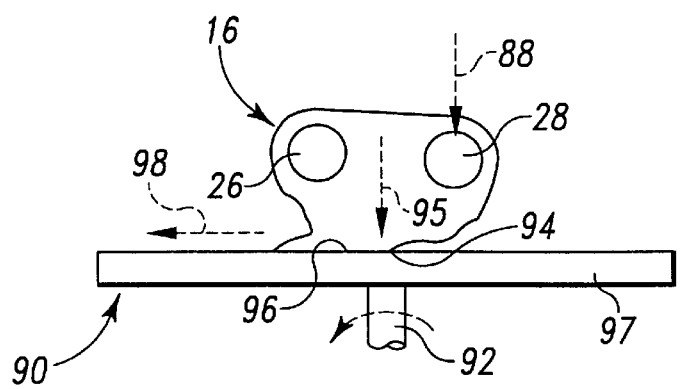
FIG. 5C is a view similar to that shown in FIG. 5B but showing the elastic distortion of the brake pad as the brake pad engages the rotating member.

FIGS. 5A, 5B, and 5C show the advantageous binding action provided by the brake assembly 10 according to the present invention. To this end, FIGS. 5A–5C show the operation of the first brake structure 16 while the brake assembly 10 of FIGS. 1 and 2 is the process of engagement. It will be appreciated that FIGS. 5A–5C show the operation of the first brake structure 16 apart from the brake structures 18, 20 and 22 for purposes of clarity of exposition.

The first brake structure 16 is located adjacent to an axial first engagement surface 96 of the rotating member 90, and as shown generally in FIGS. 1 and 2. The first brake structure 16 is furthermore located near the annular edge 97 of the first engagement surface 96 of the rotating member 90. The rotating member 90 is illustrated in FIGS. 5A–5C rotates about a shaft 92 in the direction of arrow 100. As a result, the annular edge 97 of the rotating member 90 shown in FIGS. 5A–5C moves from right to left.

It is noted that the brake pad 86 in the embodiment described herein is composed of a deformable elastic material such as a rubberized plastic. The deformable elastic material behaves such that when stress is applied to the brake pad 86, the brake pad 86 will elastically deform. When the stress is removed from the brake pad 86, the brake pad 86 will substantially return to its original shape. In a preferred embodiment of the present invention, the brake pad 86 includes a convex contact surface 94.

Referring specifically to FIG. 5A, the exemplary first brake structure 16 is shown in disengaged state. As described above, the brake assembly 10 is disengaged when the drive plate 68 or the manual override plate 80 provides the force that overcomes the bias force of the first spring 64 and second spring 66 (shown in FIGS. 1 and 2). As shown in FIG. 5A, the resulting net force is applied to the actuation pin 28 in the general direction of arrow 87, placing the brake pad 86 out of contact with the rotating member 90.

Upon engagement of the brake assembly 10, the bias force of the cross linkage 41 (shown in FIGS. 1 and 2) provides a force to the actuation pin 28 in a first axial direction with respect to the rotating member 90, shown by the arrow 88. Such a force causes the brake pad 86 to move along an arcuate path in the general direction of arrow 36. Arcuate motion of the first brake structure 16 thus moves the convex contact surface 94 of the brake pad 86 in the first axial direction with respect to the rotating member 90. The convex contact surface 94 continues to move in the first axial direction, and at some point makes initial contact with the first engagement surface 96 as shown in FIG. 5B.

As shown in FIG. 5C, after further pivotal movement of the brake pad 86 (and consequent movement of the contact surface 94 in the first axial direction), friction between the contact surface 94 of the brake pad 86 and the engagement surface 96 of the rotating member 90 creates a frictional force in the general direction of arrow 98. The frictional force is proportional to the normal force in the direction of arrow 95 between the brake shoe 86 and the rotating member 90. Moreover, the frictional force applied in the general direction of arrow 98 creates a moment about the pivot pin 26 that causes further arcuate motion of the first brake structure 16 in the general direction of arrow 36. The further arcuate motion of the first brake structure 16 increases the normal force in the general direction of arrow 95 between the first brake structure 16 and the rotating member 90, which further increases the frictional force in the general direction of arrow 98. The increased frictional force further increases the moment about the pivot pin 26 which cause yet further arcuate motion of the first brake structure 16 in the general direction of arrow 36.

Furthermore, elastic material from the substantially convex contact surface 94 of the brake pad 86 is drawn in the general direction of arrow 72 by the frictional force in the general direction of arrow 98, thus increasing the amount of material between the pivot pin 26 and the rotating member 90 and elastically deforming the shape of the brake pad 86. Increasing the amount of material between the pivot pin 26 and the rotating member 90 increases the normal force in the general direction of arrow 95 exerted by the first brake structure 16 on the engagement surface 96 of the rotating member 90. As a result, the frictional force in the general direction of arrow 98 increases, thereby further increasing the arcuate motion of the first brake structure 16. The resultant self-feeding normal force created by the frictional force and the cooperative motion of the elastic brake pad 86 causes the rotating member 90 to stop.

As a result, the first brake structure 16 of the present invention employs a binding braking action in which the first brake structure 16 is engaged to the rotating member 90 such that the rotating member 90 is inhibited from further rotational movement in the general direction of arrow 100. The rapid binding caused by the accumulation of elastic material of the brake pad 86 against the rotating member 90 is an advantage in robot applications because it provides a greater braking force than available from ordinary non-elastic brakepads moved in a normal direction with respect to the rotating member.

Although not shown in FIGS. 5A–5C, it is noted that the second brake structure 18 operates in a manner similar to the first brake structure 16. The second brake structure 18, however, is disposed adjacent the second engagement surface of the rotating member 90. The second brake structure 18 is nevertheless aligned corresponding to the first brake structure 16 with respect to the annular edge 97 (see FIGS. 1, 3 and 4). Accordingly, in operation, the second brake structure 18 moves its corresponding convex contact surface in a second axial direction toward the second engagement surface of the rotating member (See generally FIGS. 3 and 4). The use of the second brake structure 18 aligned with the rotating member 90 in a position corresponding to the position of the first brake structure 16 provides smooth braking operation by providing more or less equivalent forces to be applied to opposite engagement surfaces of the rotating member 90.

It is noted that the first brake structure 16 and second brake structure 18 provide the binding braking action in part because they are disposed in such a manner as to pivot generally in the direction of the rotation of the rotating member 90. In particular, as shown in FIG. 5A–5C, the first brake structure 16 engages the rotating member 90 by pivoting in the direction of the arrow 36, which is generally consistent with the right-to-left movement of the annular edge 97 of the rotating member 90 near which it is located. Likewise, as discussed above in connection with FIGS. 1 and 2, the second brake structure 18 moves generally in the direction of arrow 38, which, because it is disposed to engage the second engagement surface (or the opposite side) of the rotating member 90, is also consistent with the movement of the rotating member 90 shown in and described in connection with FIGS. 5A–5C.

It is further noted that if the rotating member 90 rotates in the opposite manner, for example, consistent with the arrow 99 in FIGS. 5A–5C, then the first brake structure 16 and second brake structure 18 do not provide a binding braking action. In particular, the frictional forces between the contact surfaces 94 of the first and second brake structures 16 and 18 tend to urge the first and second brake structures 16 and 18 to pivot away from the rotating member 90.

However, the third brake structure 20 and the fourth brake structure 22, configured as described above in connection with FIGS. 1, 2, 3 and 4, provide the binding braking action when the rotating member 90 is rotating in the opposite direction as that described in connection with FIGS. 5A–5C.

In particular, the third brake structure 20 is advantageously configured to operate as an opposing brake structure to the second brake structure 18. By "opposing", it is meant that the third brake structure 20 pivots in the opposite direction as the second brake structure 18, yet engages the same second engagement surface of the rotating member 90 as the second brake structure 18. Because the third brake structure 20 pivots in the opposite direction as the second brake structure 18, the third brake structure 20 provides the binding braking action described above in connection with FIGS. 5A–5C when the rotating member 90 is rotating in the opposite direction.

In a similar manner, the fourth brake structure 22 constitutes an opposing brake structure to the first brake structure 16. As a result, fourth brake structure 22 provides binding braking action similar to the first brake structure 16, but only when the rotating member 90 is rotating in the direction opposite to that shown in and described in connection with FIGS. 5A–5C.

The four brake structures 16, 18, 20 and 22 provide additional advantages over the prior art by allowing a pair of brake pads 86 to bind the rotating member 90 rotating in either direction. The first brake structure 16 and the second brake structure 18 bind the rotating member 90 when the rotating member 90 is rotating in the general direction of arrow 99 while the third brake structure 20 and the fourth brake structure 22 bind the rotating member 90 when rotating in the general direction of arrow 100. Furthermore, the linkage 41 is advantageously configured that each of the brake structures 16, 18, 20, and 22 rotates an equal amount when binding with the rotating member 90 thereby ensuring that the braking apparatus 10 binds the rotating member 90 at an equal rate regardless of the rotational direction of the rotating member 90.

A further advantage of the braking apparatus 10 is the fail safe mode of operation. Due to the spring bias of the first spring 64 and the second spring 66, the brake structures are biased into the engaged position as shown in FIG. 4. The brake assembly 10 will remain in the engaged position until acted on by an outside force. The first outside force that will disengage the braking apparatus 10 is the movement of the drive plate 68 by the solenoid plunger 76 in the general direction of arrow 62. During movement of the robot arm, a voltage is applied to the solenoid 74 such that the plunger 76 is pulled in the general direction of arrow 62. To brake the robot arm, a controller removes the voltage from the solenoid 74 to engage the braking apparatus 10. In event of a power failure, the voltage is automatically removed from the solenoid 74 and the braking apparatus 10 is placed in the engaged position. The second outside force that will disengage the braking apparatus 10 is a force applied to the manual override plate 80 in the general direction of arrow 60 which places the braking assembly 10 in the disengaged position.

While the present invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. An apparatus for braking a rotating member, the apparatus having an engaged state and a disengaged state wherein rotation of the rotating member is inhibited when the apparatus is in the engaged state, the apparatus comprising:

a solenoid operably coupled to a first brake structure such that the apparatus is in the disengaged state when activating electrical power is provided to the solenoid; and a manual override mechanism operably coupled to a second brake structure such that the apparatus is in the disengaged state when an external force is provided to the manual override mechanism;

wherein the apparatus is in the engaged state when activating power is absent from the solenoid and external force is absent from the manual override mechanism, and wherein a linkage couples the first brake structure to the second brake structure such that both the solenoid and the manual override mechanism are operable to move the first and second brake structures.

2. The apparatus of claim 1 wherein the linkage comprises a spring-loaded linkage.

3. The apparatus of claim 1 wherein the manual override mechanism comprises a manual override plate having at least one aperture, each of the at least one aperture adapted to receive an actuation pin of one of at least one brake structure.

4. The apparatus of claim 3 wherein the at least one brake structure further comprises a brake pad operably coupled to the actuation pin.

5. The apparatus of claim 1 further comprising an actuation plate having at least one aperture, the actuation plate coupled to the solenoid, the at least one aperture coupled to at least one brake structure.

6. An apparatus for braking a rotating member, the apparatus having an engaged state and a disengaged state wherein rotation of the rotating member is inhibited when the apparatus is in the engaged state, the apparatus comprising:

a first device operably coupled to a first brake structure such that the apparatus is in the disengaged state responsive to an electrical signal provided to the first device; and a manual override mechanism operably coupled to a second brake structure such that the apparatus is in the disengaged state when an external force is provided to the manual override mechanism;

wherein the apparatus is in the engaged state when the electrical signal is absent from the first device and external force is absent from the manual override mechanism, and wherein a linkage couples the first brake structure and the second brake structure such that both the first device and the manual override mechanism are operable to move the first and second brake structures.

7. The apparatus of claim 6 wherein the linkage comprises a spring-loaded linkage.

8. The apparatus of claim 6 wherein the manual override mechanism comprises a manual override plate having at least one aperture, each of the at least one aperture adapted to receive an actuation pin of one of at least one brake structure.

9. The apparatus of claim 8 wherein the at least one brake structure further comprises a brake pad operably coupled to the actuation pin.

10. The apparatus of claim 6 wherein the first device includes an actuation plate having at least one aperture, the at least one aperture coupled to the at least one brake structure.

11. An apparatus for braking a rotating member, the apparatus having an engaged state and a disengaged state wherein rotation of the rotating member is inhibited when the apparatus is in the engaged state, the apparatus comprising:
   a) a housing;
   b) an actuator including a manual override mechanism; and
   c) a first brake structure including a brake pad, the brake pad having a contact surface, the brake structure being pivotally connected to the housing and further connected to the actuator; and
      wherein the actuator is operable to cause first pivotal motion of the brake structure, thereby causing arcuate motion of the contact surface toward the rotating member, the actuator is further operable to cause second pivotal motion of the brake structure responsive to an electrical signal, thereby causing second arcuate motion of the contact surface away from the rotating member, and the manual override mechanism is operable to cause second pivotal motion of the brake structure responsive to an external force.

12. The apparatus of claim 11 wherein the actuator is further operable to cause pivotal motion of the brake structure, such that the actuator causes arcuate motion of the contact surface in a first axial direction with respect to the rotating member toward the rotating member.

13. An apparatus for braking a rotating member, the apparatus having an engaged state and a disengaged state wherein rotation of the rotating member is inhibited by the apparatus when the apparatus is in the engaged state, comprising:
   a) a housing;
   b) an actuator;
   c) a first brake structure including a brake pad, the brake pad having a substantially convex contact surface, the first brake structure being pivotally connected to the housing and further connected to the actuator;
      and wherein the actuator is operable to cause pivotal motion of the brake structure about an axis that extends in a substantially radial direction with respect to the rotating member, thereby causing arcuate motion of the contact surface toward an engagement surface of the rotating member so as to place the apparatus in the engaged state.

14. The apparatus of claim 13 further comprising a second brake structure including a second brake pad, the second brake pad having a substantially convex second contact surface, the second brake structure being pivotally connected to the housing and further connected to the actuator, and wherein the actuator is operable to cause pivotal motion of the second brake structure, thereby causing arcuate motion of the second contact surface in a second axial direction with respect to the rotating member toward a second engagement surface of the rotating member.

15. The apparatus of claim 13 wherein the actuator further includes a spring-loaded linkage that biases the contact surface toward the rotating member, thereby causing arcuate motion of the contact surface toward the engagement surface of the rotating member.

16. The apparatus of claim 15 wherein the actuator further comprises a brake release device coupled to the spring-loaded linkage that controllably urges the contact surface away from the engagement surface of the rotating member to place the apparatus in the disengaged state.

17. The apparatus of claim 16 wherein the brake release device comprises a solenoid having a plunger, and wherein the plunger engages the spring-loaded linkage, and overcomes the bias of the spring loaded linkage thereby causing arcuate motion of the contact surface away from the engagement surface of the rotating member.

18. The apparatus of claim 13 further comprising an opposing brake structure including an opposing brake pad, the opposing brake pad having a substantially convex contact surface, the opposing brake structure being pivotably connected to the housing and further connected to the actuator, and wherein the actuator is further operable to cause pivotal motion of the opposing brake structure in the opposite rotational direction of the pivotal motion of the first brake structure, thereby causing arcuate motion that moves the contact surface of the opposing brake pad toward the engagement surface of the rotating member.

19. An apparatus for braking a rotating member, the apparatus having an engaged state and a disengaged state wherein rotation of the rotating member is inhibited by the apparatus when the apparatus is in the engaged state, comprising:
   a) a housing;
   b) an actuator; and
   c) a first brake structure including a brake pad, the brake pad having a contact surface, the brake structure connected to the actuator, the brake structure further pivotally connected to the housing proximate a first end of the contact surface, said pivotal connection defining an axis that is substantially radial with respect to the rotating member;
      wherein the actuator is operable to cause motion of the brake structure, thereby causing motion of the contact surface toward the rotating member, and wherein frictional force between the rotating member and the contact surface causes arcuate motion of the contact surface about the axis toward the rotating member and places the apparatus in the engaged state.

20. The apparatus of claim 19 wherein the actuator is further operable to cause pivotal motion of the brake structure about the defined axis.

21. The apparatus of claim 19 wherein the actuator is further operable to cause pivotal motion of the brake structure in a first arcuate direction, and wherein the frictional force between the rotating member and contact surface causes arcuate motion of the contact surface in the first arcuate direction toward the rotating member.

* * * * *